Dec. 16, 1941.  H. W. UHLRIG ET AL  2,266,099
ROASTER
Filed Jan. 26, 1939  2 Sheets-Sheet 2
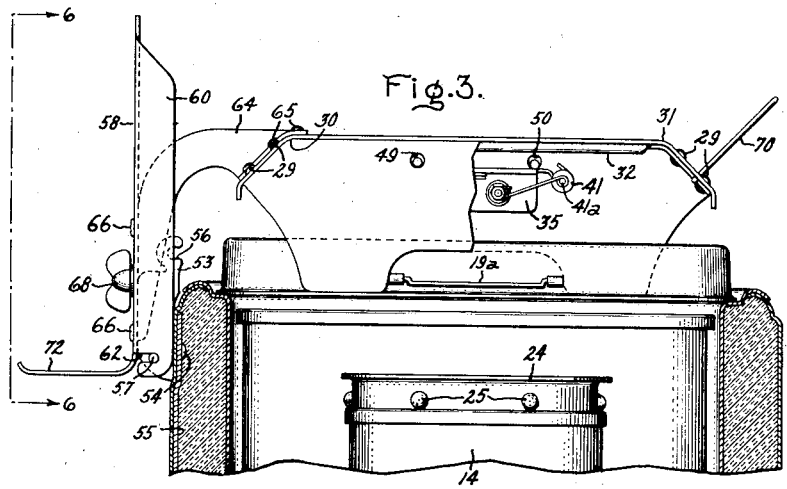
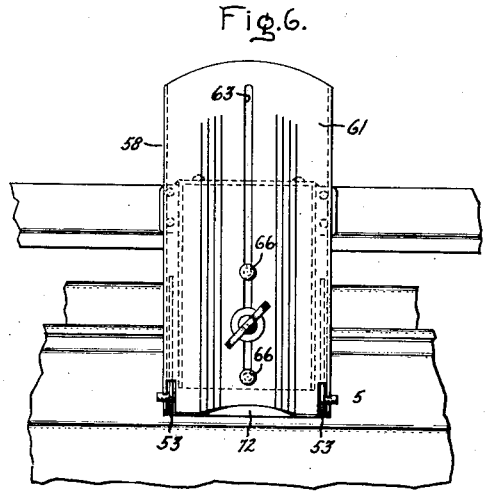
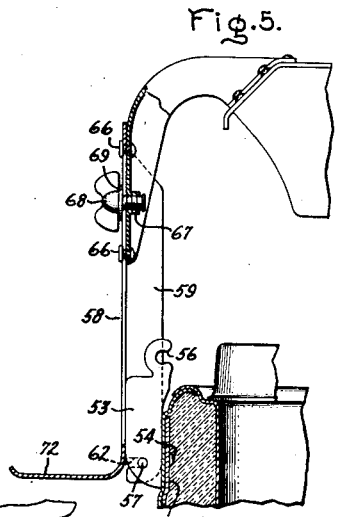
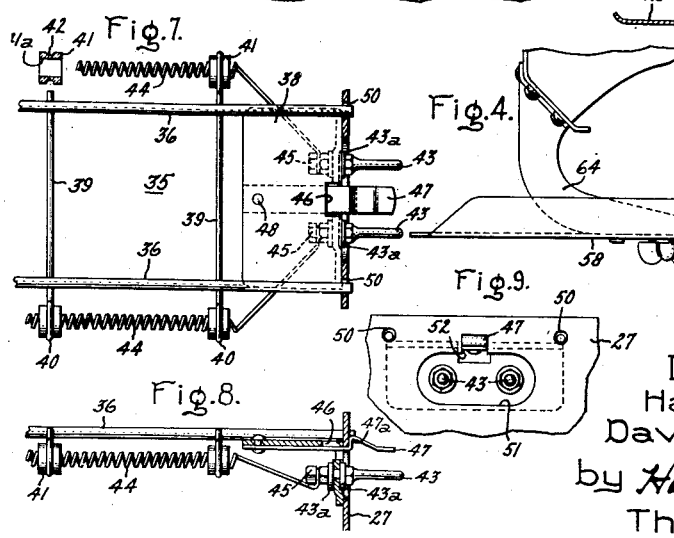
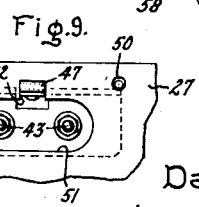
Inventors:
Harry W. Uhlrig,
David W. Gustaveson,
by Harry E. Dunham
Their Attorney.

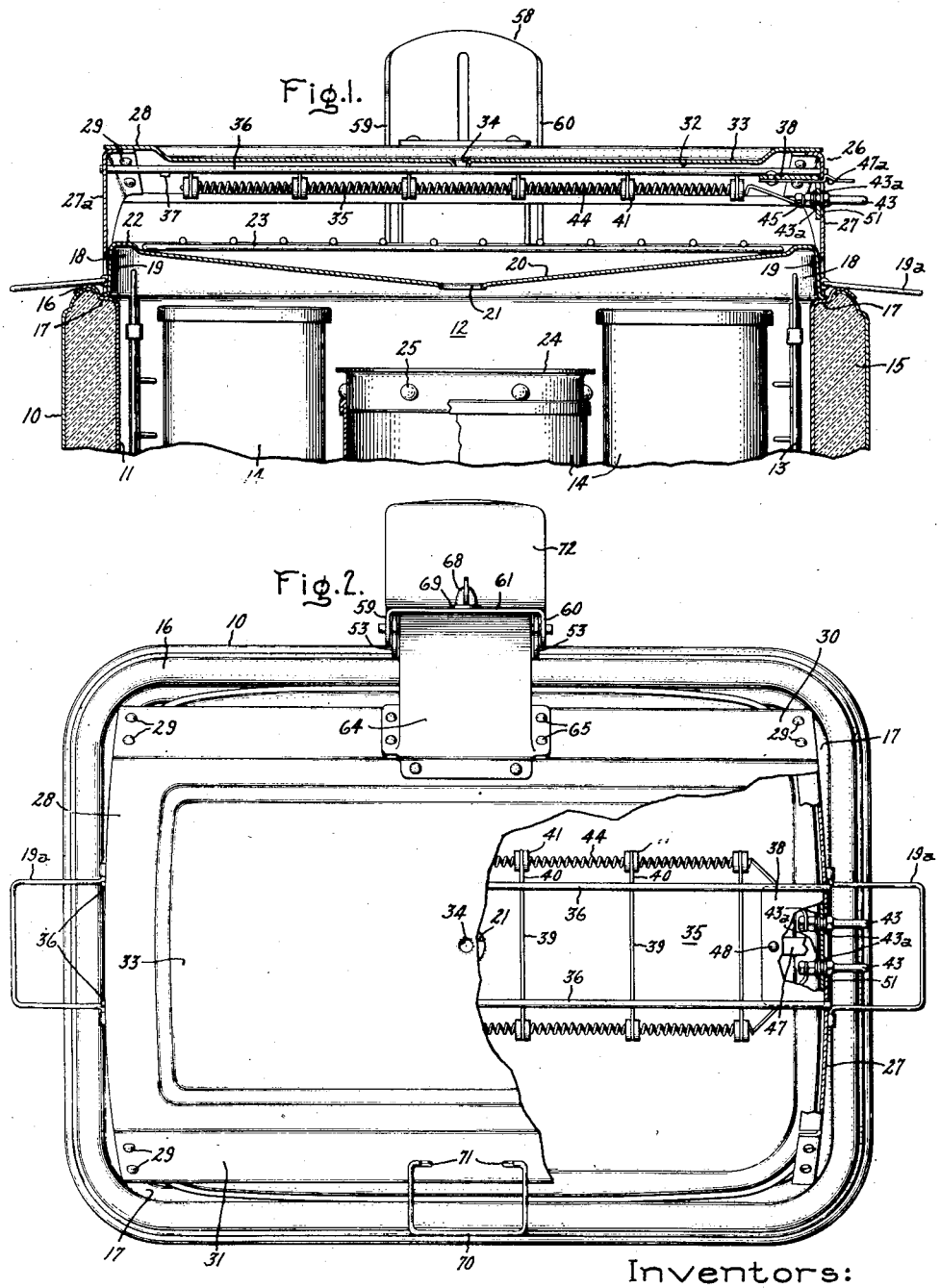

Patented Dec. 16, 1941

2,266,099

UNITED STATES PATENT OFFICE 2,266,099

ROASTER

Harry W. Uhlrig, Stratford, and David W. Gustaveson, Bridgeport, Conn., assignors to General Electric Company, a corporation of New York Application January 26, 1939, Serial No. 252,952

10 Claims. (Cl. 219—35)

This invention relates to an electric roaster and more particularly to a broiler and griddle attachment for such roaster and has for its object the provision of a simple, efficient, and rugged device of this character which can be conveniently operated and is readily removable from the roaster.

Broiler attachments have been provided for use with an electric roaster but with each of these attachments it has been necessary to remove the cooking utensils located in the roaster well in order to perform the broiling operations. This is a distinct disadvantage in those instances where a portion of the food to be served has been prepared in the roaster prior to broiling, for the removal of this food means either that it will be cooled before consumption or an additional warm storage space must be provided for it.

It is therefore an object of this invention to provide a broiler attachment for an electric roaster which is so arranged with respect to the roaster well that it is unnecessary to remove the cooking utensils located therein during broiling operations.

It is a further object of this invention to provide an attachment for an electric roaster which attachment may be used either as a broiler or as a griddle.

A further object of this invention is to provide an attachment of this character which is hingedly mounted on the roaster and can be vertically adjusted with respect to the top of said roaster.

It is a further object of this invention to provide in such a broiler and griddle attachment a heating unit of simplified construction which is detachably mounted in the attachment so that the surfaces thereof may be readily cleaned.

It is a further object of this invention to provide means for preventing short circuiting of the contact prongs of the heating unit when in use.

It is an additional object of this invention to provide a broiler and griddle attachment arranged to produce substantially smokeless operation when in use.

Further objects and advantages of this invention will appear as the following description proceeds and the features of novelty which characterize this invention will be set forth with particularity in the appended claims.

For a more complete understanding of this invention reference should be had to the accompanying drawings in which Fig. 1 represents a fragmentary elevation partly in section of an electric roaster having the broiler and griddle attachment of this invention in its operative position; Fig. 2 represents a plan view, partly in section, of the arrangement shown in Fig. 1; Fig. 3 is an end view of the arrangement shown in Figs. 1 and 2; Fig. 4 is a detailed view of the hinge construction showing the position of the broiler when rotated to its full open position; Fig. 5 is a detailed view, partly in section, of the means for vertically adjusting the broiling unit, the latter being moved the maximum distance above the broiling pan; Fig. 6 is a detailed view of the hinge construction and adjusting means taken on the line 6—6 of Fig. 3; Fig. 7 is a partial plan view of the removable heating unit of the broiler; Fig. 8 is an elevation, partly in section, of the heating unit shown in Fig. 7; and Fig. 9 is a detailed view of a portion of one end wall of the broiling unit showing the means for locking the heating unit in position.

Referring to Figs. 1 and 2, this invention is shown as applied to an electric roaster having outer walls 10 and inner walls 11 which define a roasting well 12 in which is located a suitable rack 13 upon which are arranged cooking utensils 14. A suitable insulating material 15, such as rock wool, is located between the inner and outer walls of the roaster. It will be understood that heating elements (not shown) are arranged between the inner and outer walls adjacent the side and bottom walls of the roaster well and embedded in the insulating material 15. The outer and inner walls of the roasting unit are adapted to overlap and form a circumferential joint 16 at the top of the roaster well and a marginal flange 17 is provided in the inner wall 11 adjacent the circumferential joint. In some roaster constructions it is customary to use a removable well within the roaster well. In those instances where such a construction is employed, it is to be understood that the marginal flange will be provided adjacent the top portion of the removable well.

Supported on the marginal flange 17 is an inverted pan 18 having vertical extending side walls 19 and a dished upper surface 20. Attached to the walls 19 are suitable handles 19a. Located in the center of the upper surface is an opening 21 and the surface is sufficiently dished so that it has a substantial slope toward the opening 21 except at the edge 22 adjacent the side walls 19. Arranged in the dished upper surface is a rack 23 upon which is placed the food to be broiled. It will be observed that, due to the sloping of the surface 20, the rack is spaced therefrom except at its edges. The surface 20 is highly polished and is adapted to reflect heat radiated thereto.

The entire structure just described constitutes a broiling pan for supporting the food to be broiled. It will be observed that the pan is of such construction and is supported in such a manner that it is unnecessary to remove the cooking utensils 14 located in the roaster well in order to use the broiler attachment. This is a distinct advantage especially in those cases where the roaster has been used to prepare other foods to be served with the broiled food. The sloping surface of the broiling pan constitutes a drain for any grease which drips from the food being broiled. The grease will run down this sloping surface and drain through the opening 21. A drip pan 24 is located in the roaster well to catch the grease drained through opening 21. It will be observed that the pan 24 is provided with circumferentially spaced bosses 25 which make it possible to support the drip pan within the top of one of the cooking utensils 14 as illustrated in Figs. 1 and 3.

Located adjacent the broiling pan 18 is a frame or reflector 26 having end walls 27 and 27a and a top wall 28 firmly secured thereto by means of rivets 29. The top wall 28 is pressed from a flat sheet of suitable material, such as aluminum, and includes side walls 30 and 31 which slope downwardly and outwardly from the remaining flat portion of the top wall. The under surface 32 of the top wall is provided with a suitable surface which will reflect heat radiated thereto and the sloping portions 30 and 31 tend to concentrate the heat on the broiling pan 18. Pressed into the flat surface of the top wall 28 is a dished portion 33, the surface of which is arranged to slope slightly toward the center at which an opening 34 is located. This surface 33 is adapted to serve as a griddle surface as will more fully appear hereinafter.

Removably mounted in the reflector 26 is a heating unit assembly 35 which is a unitary structure comprising a pair of longitudinally extending bars 36 which are arranged and maintained in substantially parallel relation by a transversely extended bar 37 (Fig. 1) attached to the bars adjacent one end, and an L-shaped plate 38 attached to the bars of the other end. Arranged intermediate the bar 37 and the plate 38 is a plurality of bars 39 extending transversely of the longitudinal bar 36 and having ends 40 which extend beyond these bars. The bar 37, the plate 38 and the bars 39 are attached to the longitudinal bar 36 in any suitable manner, as by welding. Mounted in each of the ends 40 is an insulator 41 which is provided with a centrally arranged opening 41a and a circumferential groove 42. In mounting the insulators 41 in the ends 40 of the transverse supporting rods 39 a substantially U-shaped loop is formed in the ends and the insulator is set into this loop so that the rod 39 extends into the groove 42 provided in the insulator. The upper portion of the U-shaped loop is then bent downwardly so as to form a substantially closed loop about the insulator as shown in Fig. 3.

A pair of contact prongs 43 extends through and is firmly attached to one wall of the L-shaped plate 38. The prongs 43 are insulated from the wall of the plate 38 by means of washers 43a of suitable insulating material. A suitably coiled resistance wire 44 is threaded through the opening 41a in insulators 41 and is connected at its ends to the terminals 45 provided at the ends of the pair of prongs 43. The resistance wire 44 may be of any suitable material capable of generating and withstanding the operating temperatures of the broiling unit.

Provided in the L-shaped plate 38 of the heating unit assembly 35 is an opening 46 through which extends a resilient clip 47 which is firmly attached at one end by means of a rivet 48 to the horizontally extending portion of the L-shaped plate 38. Provided in the clip 47 is a detent 47a (Figs. 1 and 8), the purpose of which will more fully appear hereinafter. It will be observed that the resilient clip 47 extends substantially parallel to the contact prongs 43 but is spaced above the prongs as shown in Figs. 1 and 8. With such an arrangement, short circuiting of the heating unit by accidentally dropping a kitchen utensil, such as a knife or a fork, on the contact prongs is prevented.

Provided in one end wall 27a of the frame or reflector 26 adjacent the top edge thereof is a pair of openings 49 (Fig. 3) adapted to receive the ends of the longitudinally extending bars 36. Provided in the opposite end wall 27 of the frame 26 is a similarly located pair of openings 50 (Figs. 3, 7 and 9) adapted to receive the opposite ends of the longitudinally extending bars 36. Also provided in the same end wall 27 is an opening 51 through which is adapted to extend the contact prongs 43. The opening 51 is provided with a recess 52 adapted to receive the resilient clip 47. By means of the co-operation between the resilient clip 47 and the recess 52, the heating unit assembly is firmly locked in position. In inserting the heating unit in the frame or reflector 26, the ends of the rods 36 adjacent the bar 37 are inserted in the openings 49 and the heating unit is moved to the left a distance sufficient to permit the contact prongs 43 to clear the side wall 27. The unit is then moved upwardly until the prongs are opposite the opening 51. It is then moved to the right until the end of the resilient clip 47 engages the recess 52, which is of such depth that the engagement of the clip 47 therewith automatically aligns the right-hand end of the bars 36 with the openings 50 thereby facilitating the insertion of the bars into these openings. Upon further movement to the right, the clip 47 rides on the portion of the end wall 27 until the detent 47a snaps over the end wall and firmly locks the heating unit assembly in position.

The heating unit assembly and the reflector constitute the broiling unit. With such a broiling unit, it is desirable to have it readily removable from the roaster when it is no longer needed and yet hinged to the roaster when in use. Furthermore, it is desirable to have such a broiling unit adjustable to accommodate different types of food and to control the transmission of heat thereto. Turning to the structure for accomplishing these ends in accordance with this invention, it will be observed that a pair of hinge brackets 53 is mounted on the outside wall 10 of the roaster. These hinge brackets are firmly held in position by means of rivets 54 which are adapted to extend through a reenforcing plate 55 extending along the inside of the wall 10 adjacent the point of attachment of the hinge bracket 53. Each hinge bracket is provided at one end with a slotted portion 56 which is used in hinging the roaster cover (not shown) to the roaster during roasting operations. Provided in the end of each hinge bracket remote from the slot 56 is a stud 57 extending outwardly from the sides thereof. A hinge plate 58 of substantially channel shape having a pair of side walls 59 and 60 between which extends a wall 61 is adapted to be movably mounted on the studs 57. In order to effect this mounting a recess or a slot 62 is cut into each of the side walls 59 and 60 adjacent the lower end thereof. The studs 57 are adapted to be inserted in the slots 62 thereby forming a rotatable or hinged mounting between the hinge plate 58 and the outside wall 10 of the roaster. Provided in the wall 61 of the hinge plate along the longitudinal center thereof and extending substantially throughout the length of this wall is a slot 63, the purpose of which will be described presently.

Mounted on the side wall 30 of the top wall 28 of the reflector 26 is a substantially L-shaped bracket 64 which is firmly fixed to the wall 30 by means of rivets 65. The bracket 64 is provided with a vertically extending portion of substantial length and of such width that it can be inserted between the side walls 59 and 60 of the channel shaped hinge plate 58. Provided in this vertically extending portion of the bracket 64 is a pair of studs 66 which are adapted to be inserted in the slot 63 provided in the hinge plate. It is apparent that with such an arrangement the frame 26 and the heating unit assembly mounted therein can be moved relative to the hinge plate and hence vertically adjusted with respect to the top of the roaster well and the broiling pan 18 supported thereon. The bracket 64 is also provided with a threaded opening 67 into which is screwed a thumb screw 68 which is provided with a washer 69 adapted to firmly clamp or lock the bracket 64 and the associated broiler unit in its vertically adjusted position, the thumb screw and washer arrangement firmly clamping the hinge plate and bracket in fixed relation with respect to each other. In order to prevent complete disengagement of the thumb screw with the bracket 64 the end of the thumb screw is peened over thereby making it impossible to remove it from the threaded portion 67.

As already pointed out, the broiler unit by means of the hinge plate and its pivotal connection to the hinge bracket 53 is adapted to be rotated with respect to the roaster. This means that the broiler unit can be swung from a horizontal position, such as shown in Figs. 1, 2 and 3, to a substantially vertical position, as shown in Fig. 4. In order to facilitate this swinging movement a handle 70 (Figs. 2 and 3) is provided in suitable openings 71 provided on the side wall 31 of the top well. The handle 70 is made of some suitable resilient material and is adapted to be inserted into the openings 71 and then spring into position so that it extends substantially perpendicularly to the inclined wall 31 at all times thereby preventing it from becoming unduly heated during the broiling operation. Integral with the hinge plate is a flange 72 which extends substantially perpendicular to the wall 61 of the hinge plate. This flange 72 serves as a stop to limit the counterclockwise rotation of the broiling unit. When the flange 72 engages the outside wall 10 of the roaster, the broiler unit is in a substantially vertical position as shown in Fig. 4. The clockwise rotation of the hinge plate and broiling unit is limited by the engagement of the walls 59 and 60 of the channel shaped hinge plate with a wall 10 of the roaster. When these side walls engage the roaster wall, the broiling unit is substantially horizontal as shown in Fig. 3.

As previously pointed out, openings 21 and 34 are provided in the griddle surface 33 and the surface 20 of the broiling pan respectively and the respective surfaces slope toward the openings. During the operation of the attachment as either a broiler or a griddle surplus grease is drained from the surface through the openings and into the pan 24.

In operation, as a broiling unit, the cover of the roaster is removed and without disturbing the contents of the roaster well the broiling pan 18 including the rack 23 is mounted on the marginal flange 17 provided at the top of the roaster well. The frame 26 and its associated heating units are then mounted on the roaster by inserting the studs 57 in the slots 62 provided in the side walls 59 and 60 of the hinge plate 58. During this operation, the frame and hinge plate are in the position shown in Fig. 4. The food to be broiled is then placed on the rack 23 and the frame and heating unit are rotated to the position shown in Figs. 1 and 3. Depending upon the food to be broiled and the manner in which it is to be broiled, the frame and heating unit are vertically adjusted with respect to the broiling pan by sliding the studs 66 in the slot 63 provided in the hinge plate. When the desired position is obtained, the frame and heating unit are locked in the adjusting position by means of the thumb screw 68. During the broiling of the food, it is unnecessary to disturb the adjustment of the frame and heating unit unless it is desired to alter the manner in which the food is being broiled. If it is desired to inspect or turn the food resting on the broiling pan rack, the frame and broiling unit may be rotated about the studs 57 in the manner indicated.

When the food has been placed in position and the frame adjusted to a suitable height, the contact prongs are inserted in a suitable plug connection to a source of power. The spring clip 47 is so spaced with respect to the contact prongs 43 that the insertion of the prongs in a suitable plug member causes the spring to be stressed upwardly thereby positively locking the heating unit in position so long as the plug is in engagement with the contact prongs. In addition, the spring 47 exerts a force on the plug member tending to hold it in engagement with the contact prongs thereby preventing accidental disengagement thereof. With a source of energy connected to the contact prongs, the heating unit 35 is energized and heat is transmitted to the food supported on the broiler pan rack by direct radiation from the heating unit and also by reflection from the under surface of the top wall of the frame 26. In this manner the energy available for cooking is readily and efficiently transmitted to the material to be cooked. As previously explained, any grease which is produced during the broiling operation runs down the sloping surface of the broiling pan and through the opening 21 into the drip pan 24. In this way, the grease is quickly drained from the heated surface of the broiling pan and the undesirable smoking and burning of this grease is substantially eliminated.

When the attachment is to be used as a griddle, the drip pan and broiling pan are again arranged in the position shown, and the frame 26 is mounted on the roaster as shown in Fig. 3. With the heating unit connected to a source of energy in the manner described in connection with the description of the broiling operation, the unit is energized and heat is transmitted to the griddle surface 33 by direct radiation from the heating element and also by reflection from the surface 20 of the broiling pan 18. It is to be observed that the heating element is mounted adjacent the griddle surface thereby insuring that this surface will become sufficiently hot to suitably cook the food placed on the surface 33.

After the attachment has been used either as a broiler or as a griddle, the surfaces thereof may be readily cleaned by removing the frame from the roaster and then detaching the heating unit assembly from the frame. To detach the heating unit, it is only necessary to press downwardly on the spring clip 47 so that the detent 47a no longer engages the side wall 21 of the frame. The unit is then moved to the left until the ends of the contact prong 43 clear the end wall 27 of the frame. The unit is then moved downwardly and to the right until the bars 36 are removed from the openings 49 provided in the left-hand end wall 27a. With the heating unit removed, the surface of the frame may be thoroughly cleaned with water or other suitable cleaning agents.

From the foregoing description, it is apparent that in accordance with this invention there has been provided for an electric roaster a broiler and griddle attachment of simple and rugged construction which can be easily and conveniently operated without disturbing the contents of the roaster well. While this invention has been described in detail in connection with one form thereof, it is to be understood that it is not to be limited to this form and it is intended in the appended claims to cover all modifications thereof within the true spirit and scope of this invention.

What we claim as new and desire to secure by Letters Patent of the United States is:

1. A combined baking and broiling device comprising walls defining a cooking well having an opening at the top and adapted to receive through said opening utensils containing food to be cooked by a baking operation, a flange formed around said opening, and a broiling unit including a removable broiling pan having a portion engaging said flange to hold said pan above said well and out of the portion of said well occupied by said utensils so that food supported on said broiling pan may be broiled during or after a baking operation without removing said utensils positioned in said well.

2. A combined baking and broiling device comprising walls defining a cooking well having an opening at the top and adapted to receive through said opening utensils containing food to be cooked by a baking operation, a flange formed on said walls adjacent said opening, and a broiling unit including a removable broiling pan having an upper surface and side walls projecting downwardly from said surface and engaging said flange to support said surface above said opening and out of the portion of said well occupied by said utensils so that a broiling operation may be performed during or after a baking operation without removing said utensils positioned in said well.

3. A combined baking and broiling device comprising walls defining a cooking well having an opening at the top and adapted to receive through said opening utensils containing food to be cooked by a baking operation, a flange formed in said walls adjacent said opening, a broiling unit including a removable broiling pan having a downwardly sloping top surface, and means for supporting said pan on said flange, said means comprising integrally formed downwardly extending side walls on said pan having a depth greater than the depth of said sloping surface to support said surface above said well so that said broiling unit may be used either during or after a baking operation without removing said utensils from said cooking well.

4. A broiling attachment adapted to be used with an electric roaster of the type having walls defining a cooking well with an opening at the top and having hinge brackets on one of said walls, comprising, a broiling pan having side walls adapted to engage said roaster walls adjacent said opening to support said pan so that no portion thereof lies within said well, a reflector adapted to be supported above said pan, a heating unit removably supported within said reflector, a hinge plate extending downwardly from said reflector and having slots in the lower portion thereof adapted to engage said hinge brackets on said roaster to removably hinge said reflector on said roaster and above said pan, and means for adjustably securing said reflector to said hinge plate so that said reflector and said heating unit supported therein may be vertically adjusted relative to said pan to produce different broiling conditions.

5. An attachment adapted for use with an electric roaster of the type having walls defining a cooking well open at the top and having hinge means on one of said walls, comprising, a substantially rectangular shaped reflector adapted to be supported above the top of said cooking well, a longitudinally extending heating unit supported within said reflector, a hinge plate having slots in the lower portion thereof adapted to engage said hinge means on said roaster wall to removably hinge said reflector and said heating unit on said roaster, a vertically extending slot in said hinge plate, a bracket secured to said reflector, studs on said bracket adapted to track in said vertically extending slot to permit vertical adjustment of said reflector and said heating unit secured thereto with respect to said top of said roaster well, and locking means extending through said slot so as to clamp said bracket and said hinge plate together to support said reflector in its adjusted position on said roaster.

6. An attachment for use with an electric roaster of the type having walls defining a cooking well open at the top, comprising, a substantially rectangular shaped reflector, a longitudinally extending heating unit removably supported within said reflector, a plate secured to said reflector and extending downwardly therefrom, means defining slots in the lower portion of said plate adapted to cooperate with brackets on one of said walls of said roaster to hingedly mount said reflector on said roaster above the top thereof, said slots having an open end portion permitting engagement or disengagement with said brackets, and a projection on said plate near the lower portion thereof adapted to engage said one wall of said roaster to limit the hinging movement of said reflector to define an open position in which access to said cooking well is unobstructed, said open end of said slots extending downwardly when said reflector is in said open position so that said reflector may be removed by a vertical movement thereof relative to said roaster.

7. An attachment adapted for use with an electric roaster of the type having walls defining a cooking well open at the top and having hinge means on one of said walls, comprising, a substantially rectangular shaped reflector, a longitudinally extending heating unit supported within said reflector, a hinge plate extending downwardly from said reflector and having slots in the lower portion thereof adapted to be engaged by said hinge means on said roaster to hinge said reflector on said roaster so that it lies above the top of said roaster well, means for adjustably securing said reflector to said hinge plate so that said reflector and said heating unit secured thereto may be vertically adjusted with respect to the top of said cooking well, and a projection integrally formed on said hinge plate adapted to engage said wall of said roaster to which said hinge means are secured to limit the hinging movement of said reflector and define an open position, said slots being positioned in said hinge plate so that when said reflector is in said open position said attachment may be readily removed from said roaster.

8. A combined broiler and griddle attachment for an electric roaster comprising a griddle surface, a reflecting surface on the under side of said griddle surface, a heating unit removably secured to said griddle surface adjacent said reflecting surface, a broiling pan adapted to be supported below said heating unit, said broiling pan having a reflecting surface in the path of heat radiated from said heating unit, means on said broiling pan for supporting foods to be broiled, and means for vertically adjusting said griddle surface with said heating unit secured thereto with respect to said broiling pan, said means having one position in which said griddle surface and said heating unit secured thereto are supported in close proximity to said broiling pan so that substantially all of the heat emitted by said heating unit is transmitted to said griddle surface either directly or by reflection from said upper reflecting surface of said broiling pan to raise the temperature of said griddle surface to that required for griddle operations, and a plurality of other positions in which said griddle surface and said heating unit secured thereto are supported at greater distances from said broiling pan than in said one position depending upon the thickness of said food to be supported on said supporting means for broiling and the amount of heat required for the particular broiling operation, said griddle surface when in said other positions receiving substantially less heat than when in said one position so that its temperature is lower than that required for griddle operations.

9. A broiler-griddle attachment for an electric roaster having a roasting well with an opening at the top and a marginal flange adjacent said opening, comprising, a broiling pan having side walls adapted to engage said marginal flange to support said pan so that no portion thereof lies within the roasting well, a reflecting upper surface on said broiling pan, a reflector mounted above said broiling pan, a griddle surface integrally formed in the top of said reflector, a heating unit detachably mounted in said reflector adjacent the under side of said griddle surface, and means for vertically adjusting said reflector with respect to said broiling pan, said adjusting means having one position for griddle operations in which said reflector and said heating unit are supported in close proximity to said broiling pan so that substantially all of the heat from said heating unit is transmitted to said griddle surface either directly or by reflection from said upper reflecting surface of said broiling pan to heat said griddle surface to the temperature required for cooking operations thereon, and having a plurality of other positions for broiling operations in which said reflector is vertically spaced from said broiling pan so that said pan may support food to be broiled having different thicknesses, said griddle surface receiving substantially less heat when in said other positions than when in said one position so that its temperature is lower than in said one position.

10. A broiler-griddle attachment adapted for use with an electric roaster having walls defining a cooking well with a top opening and a marginal flange surrounding said opening, comprising, a broiling pan adapted to be supported on said flange and having a downwardly sloping upper surface terminating in a drain opening, a reflector supported above said broiling pan, a heating element removably mounted in said reflector, a depression in the upper surface of said reflector defining a griddle surface, means defining a drain opening in said griddle surface directly above said drain opening in said broiling pan and spaced from said heating unit so that grease may be drained from said griddle surface without contacting said heating unit, and means positioned below said drain opening in said broiling pan and adapted to be received in the cooking well of said roaster for collecting the greases drained from said broiling pan and said griddle surface so that substantially smokeless operation of said attachment is produced.

HARRY W. UHLRIG.
DAVID W. GUSTAVESON.